United States Patent [19]

Kobayashi et al.

[11] Patent Number: 4,754,660
[45] Date of Patent: Jul. 5, 1988

[54] REDUCTION GEARING DEVICE FOR AN AUTOMOBILE ACCESSORY MOTOR

[75] Inventors: Kyoji Kobayashi, Chigasaki; Yasuo Ohashi, Yokohama; Hayao Itoh, Fujisawa, all of Japan

[73] Assignee: Jidosha Denki Kogyo Kabushiki Kaisha, Japan

[21] Appl. No.: 892,455

[22] Filed: Aug. 4, 1986

Related U.S. Application Data

[63] Continuation of Ser. No. 604,292, Apr. 19, 1984, abandoned.

[30] Foreign Application Priority Data

Apr. 28, 1983 [JP] Japan ................................ 58-63069

[51] Int. Cl.$^4$ ............................ F16H 1/16; F16H 1/20
[52] U.S. Cl. ........................................ 74/427; 74/410; 74/421 A; 74/458
[58] Field of Search ..................... 74/410, 421, 424.5, 74/425, 427, 457, 458

[56] References Cited

U.S. PATENT DOCUMENTS

| | | | |
|---|---|---|---|
| 1,409,319 | 3/1922 | Vaughan | 74/410 |
| 4,282,767 | 8/1981 | Guichard | 74/427 |
| 4,369,387 | 1/1983 | Haar et al. | 74/427 |
| 4,444,071 | 4/1984 | Guichard | 74/427 |

FOREIGN PATENT DOCUMENTS 2372998 6/1978 France .
2521671 8/1983 France .

Primary Examiner—Dirk Wright
Attorney, Agent, or Firm—Sughrue, Mion, Zinn, Macpeak, and Seas

[57] ABSTRACT

A reduction gearing device for automobile accessory motor comprises first and second worms coaxially formed on a worm shaft in different thread directions, a pair of first and second intermediate gears each composed of two gear members, with one gear of each pair being engaged with a respective worm, and a common output gear engaged with the other gear member of each of the intermediate gears. The engagement of one intermediate gear with the first worm is in phase with the engagement of the other intermediate gear with the second worm while the engagement of one intermediate gear with the common output gear is in phase with the engagement of the other intermediate gear with the common output gear.

2 Claims, 2 Drawing Sheets

REDUCTION GEARING DEVICE FOR AN AUTOMOBILE ACCESSORY MOTOR

BACKGROUND OF THE INVENTION

This is a continuation of application Ser. No. 604,292 filed Apr. 19, 1984, now abandoned.

(1) Field of the Invention

This invention relates to a reduction gearing device for an automobile accessory motor such as a windshield wiper motor, a power sheet motor or the like, and more particularly to a reduction gearing device provided with a right-handed worm and a left-handed worm having different thread directions.

(2) Description of the Prior Art

Heretofore, there has been used the reduction gearing device provided with the right-handed and left-handed worms as shown, for example, in FIG. 1.

In the reduction gearing device of FIG. 1, numeral 11 is a windshield wiper motor for driving an electric windshield wiper for an automobile, numeral 12 is a field magnet fixed to an inner wall of a motor yoke 13, numeral 14 is an armature fixed to a motor shaft 15 and being rotatable to the field magnet 12, numeral 16 is a commutator attached to the armature 14, numeral 17 is a gear housing connected to the motor yoke 13, and numerals 18, 19 are bearings rotatably supporting the motor shaft 15.

In the gear housing 17, a worm shaft 3 extending from the motor shaft 15 is coaxially provided with a right-handed worm 1 and a left-handed worm 2, which are engaged with large-diameter gear members 4a, 5a in a pair of two-stage intermediate gears 4, 5 rotatably supported in the gear housing 17. In this case, the intermediate gears 4, 5 are arranged at opposite positions with respect to the worm shaft 3 so as to rotate in the same direction. Further, small-diameter gear members 4b, 5b of the intermediate gears 4, 5 are engaged with an output gear 6 pivotably supported in the gear housing 17. Thus, a rotary shaft of the output gear 6 is an output shaft for transmitting a reduced rotation number.

According to the reduction gearing device of the aforementioned structure, the right-handed worm 1 and the left-handed worm 2 are formed on the worm shaft 3 and engaged with the intermediate gears 4, 5 each engaging with the output gear 6, whereby not only radial loading produced by the rotation of the worm shaft 3 is substantially offset but also thrust loading in an axial direction can completely be restrained, so that it is a reduction gearing device reducing the transmission loss of rotation with high efficiency.

In the conventional reduction gearing device, however, there are many engaging points in the engagement of the two worms 1, 2 with large-diameter gear members 4a, 5a in the intermediate gears 4, 5 and the engagement of the small diameter gear members 4b, 5b with the output gear 6, so that the accuracy of each of these gears should be regulated very precisely because it largely influences the occurrence of noise in the operation of the device. Furthermore, when the gear is particularly formed by using synthetic resin or the like, a highly skilled technique is required for finishing the tooth profile of the gear with a high accuracy, which results in the increase of cost.

SUMMARY OF THE INVENTION

Object of the invention is to eliminate the aforementioned drawbacks of the prior art and to provide a reduction gearing device for automobile motor capable of largely reducing noises in the operation of the device.

That is, the reduction gearing device for automobile accessory motor according to the invention is characterized in that the first and second worms having different thread directions are engaged with respective first stage gear members of two-stage intermediate gears the same phase, and other-side gear members of the two-stage intermediate gears are engaged with the output gear at the same phase, whereby the occurrence of noises in the engaging between the opposed gears is reduced considerably.

BRIEF DESCRIPTION OF THE DRAWING

The invention will be described in detail with reference to the accompanying drawing, wherein.

DETAILED DESCRIPTION OF THE INVENTION

Figure 1:
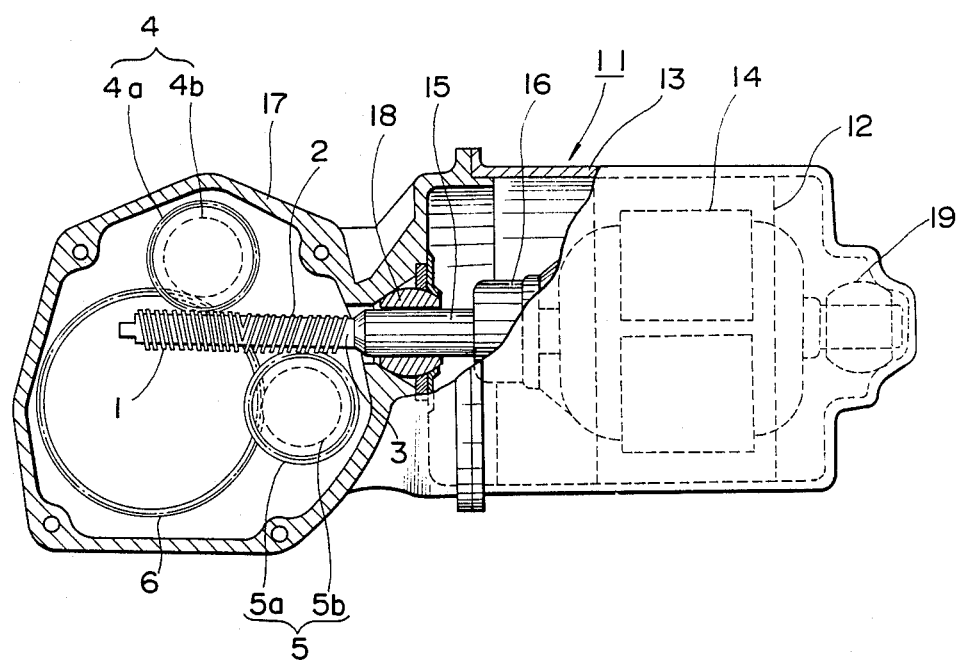
FIG. 1 is a front view partly shown in section of the conventional automobile motor provided with a reduction gearing device as mentioned above.
Figure 2:
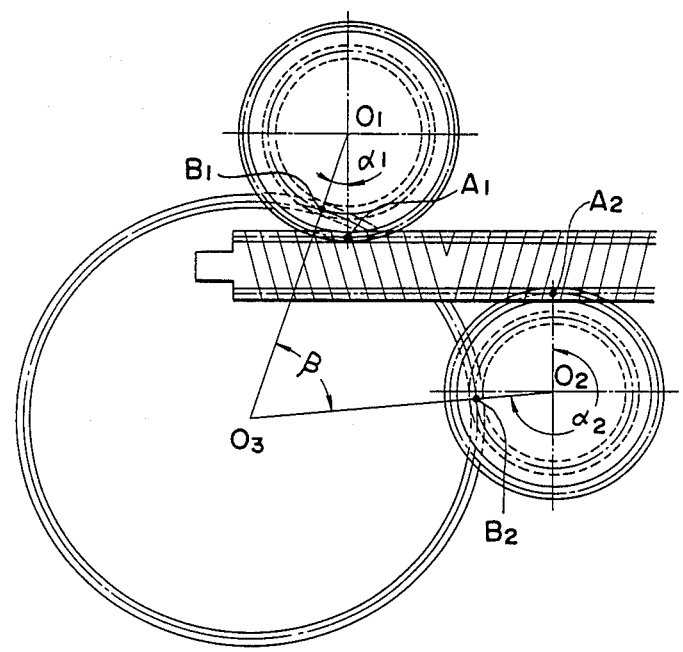
FIG. 2 is a schematic view of an embodiment of the reduction gearing device according to the invention.
Figure 3A:
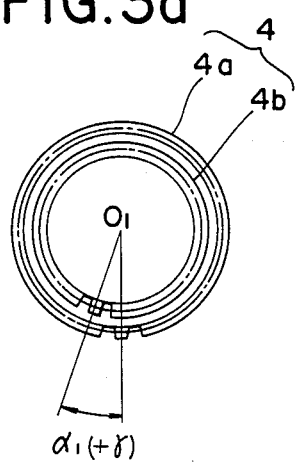
FIGS. 3a and 3b are schematic views illustrating the arrangements of a pair of two-stage intermediate gears, respectively.
Figure 3B:
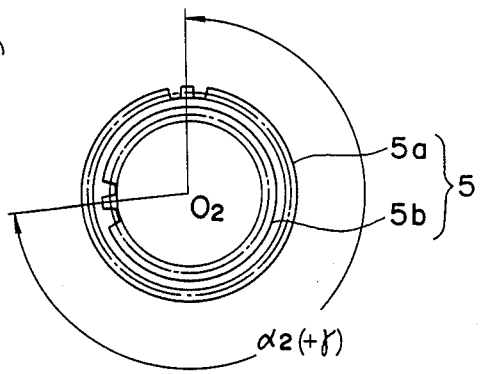

FIGS. 2 and 3 show an embodiment of the reduction gearing device according to the invention, in which only the reduction gearing mechanism is illustrated because the other motor mechanism is the same as shown in FIG. 1. As shown in FIGS. 2 and 3, first worm 1 and second worm 2 having different thread directions are coaxially formed on a worm shaft 3.

Two two-stage intermediate gears 4 and 5, having respective centers $O_1$ and $O_2$, are located at opposite sides of the worm shaft 3. A first stage gear number $4a$ of intermediate gear 4 is engaged with the first worm 1 at an engaging point $A_1$. A first stage gear number $5a$ of intermediate gear 5 is engaged with the second worm 2 at an engaging point $A_2$.

Further, second stage gear members $4b$ and $5b$ of the intermediate gears 4 and 5 are engaged with a common output gear 6 having a center $O_3$, at engaging points $B_1$ and $B_2$, respectively.

In the reduction gearing device of the above structure, the engagements at the engaging points $B_1$ and $B_2$ are in phase with each other, i.e., at every moment the teeth engaging at $B_1$ and the teeth engaging at $B_2$ are in the same condition. For this purpose, angle $\beta$ between line segments connecting center $O_3$ to centers $O_1$ and $O_2$ (i.e., $\beta = <O_1O_3O_2$) is an integral multiple of the pitch of the output gear 6 (360°/ tooth number). The tooth engagements at the engaging points $A_1$ and $A_2$ are also in phase with each other, i.e., at every moment the teeth engaging at $A_1$, and the teeth engaging at $A_2$ are in the same condition. For this purpose, the two gear members $4a$ and $4b$ of intermediate gear 4 are arranged at a phase angle $\alpha_1 + \gamma$, while the two gear members $5a$ and $5b$ of intermediate gear 5 are arranged at a phase angle $\alpha_2 + \gamma$, wherein $\alpha_1$ is the angle between line segments connecting center $O_1$ to center $O_3$ and to engaging point $A_1$ (i.e., $\alpha_1 = <O_3O_1A_1$), $\alpha_2$ is the angle between line segments connecting center $O_2$ to center $O_3$ and to engaging point $A_2$ (i.e., $\alpha_2 = <O_3O_2A_2$), and $\gamma$ is an angle representing the difference in phase between engagement at points $A_1$, $B_1$, and $A_2B_2$. Thus, a point on a tooth of gear member 4a and a corresponding point on a tooth of gear member 4b are spaced by an angle $\alpha_1+\gamma$, and a point on a tooth of gear member 5a and a cooresponding point on a tooth of gear member 5b are spaced by an angle $\alpha_2+\gamma$. A point on a tooth of gear 4a might engage at $A_1$, while a corresponding point on a tooth on gear 4b might be offset from engagement point $B_1$ by angle $\gamma$. This is acceptable as long as $\gamma$ is the same for gear members 4 and 5.

Thus, the first and second worms 1, 2 are always engaged with the first stage gear members 4a, 5a of the intermediate gears 4, 5 at the engaging points $A_1$, $A_2$ in the same phase, while the second stage gear members 4b, 5b of the intermediate gears 4, 5 are always engaged with the common output gear 6 at the engaging points $B_1$, $B_2$ in the same phase, whereby the occurrence of noises can effectively be prevented during the transmission of reduced rotation number.

As mentioned above, according to the invention, the engagement of the first and second worms having different thread directions with the first stage gear members of the two-stage intermediate gears is made always to the same phase, and the engagement of the second stage gear members of the intermediate gears with the common output gear is also made always to the same phase, so that not only the radial loading produced by the rotation of the worm shaft is substantially offset, but also the thrust loading in the axial direction can completely be restrained. As a result, it is possible not only to mitigate the transmission loss of the rotation but also to considerably reduce the occurrence of noises in the rotation transmission without finishing the tooth profile of each gear with a high accuracy. Particularly, the invention is suitable for use in reduction gearing devices using gears made from synthetic resin.

What is claimed is:

1. A reduction gearing device, for use in a windshield wiper motor, comprising:

first and second worms (1, 2) coaxially formed on a worm shaft (3) in different thread directions, an output gear (6) having a center, a first two stage intermediate gear (4) having a center and having first and second stage gear members (4a, 4b) engaged with said first worm (1) and said output gear (6) at first and second engaging points, respectively, a second two stage intermediate gear (5) having a center and having first and second stage gear members (5a, 5b) engaged with said second worm (2) and said output gear (6) at third and fourth engaging points, respectively, said first and second intermediate gears (4, 5) being located at opposite sides of said worm shaft (3), said first and second intermediate gears (4, 5) and said output gear (6) being located and phase controlled so that an angle between the lines connecting the center of the output gear (6) with the centers of the first and second intermediate gears (4, 5) is an integral multiple of the angle which is equal to 360° divided by the number of teeth on the output gear (6) and so that the second and fourth engaging points are in the same phase with each other, said first and second intermediate gears (4, 5) and said first and second worms (1, 2) being phase controlled so that the first and third engaging points are in the same phase with each other by means of the arrangement of an off-set angle in said first and second stage gear members (5a, 5b) of said second intermediate gear (5) on the basis of an off-set angle in said first and second stage gear members (4a, 4b) of said first intermediate gear (4).

2. A reduction gearing device, for use in a windshield wiper motor, according to claim 1, wherein said first and second stage gear members (4a, 4b) of said first intermediate gear (4) have an off-set angle $\alpha_1+\gamma$, wherein $\alpha_1$ is the angle between the lines connecting the center of the first intermediate gear (4) with the first engaging point and the center of the output gear (6) and $\gamma$ is an angle of predetermined value and said first and second stage gear members (5a, 5b) of said second intermediate gear (5) have an off-set angle $\alpha_2+\gamma$, wherein $\alpha_2$ is the angle between the lines connecting the center of the second intermediate gear (5) with the third engaging point and the center of the output gear (6) and $\gamma$ is an angle of predetermined value.

* * * * *